US00RE46714E

(19) United States
(12) Reissued Patent
Park et al.

(10) Patent Number: US RE46,714 E
(45) Date of Reissued Patent: *Feb. 13, 2018

(54) METHOD OF TRANSMITTING AND RECEIVING RADIO ACCESS INFORMATION IN A WIRELESS MOBILE COMMUNICATIONS SYSTEM

(71) Applicant: EVOLVED WIRELESS LLC, Austin, TX (US)

(72) Inventors: Sung Jun Park, Gyeonggi-do (KR); Young Dae Lee, Gyeonggi-do (KR); Sung Duck Chun, Gyeonggi-do (KR); Myung Cheul Jung, Gyeonggi-do (KR)

(73) Assignee: EVOLVED WIRELESS LLC, Austin, TX (US)

( * ) Notice: This patent is subject to a terminal disclaimer.

(21) Appl. No.: 14/723,093

(22) Filed: May 27, 2015

Related U.S. Patent Documents

Reissue of:
(64) Patent No.: 8,219,097
Issued: Jul. 10, 2012
Appl. No.: 12/870,747
Filed: Aug. 27, 2010

U.S. Applications:
(60) Division of application No. 14/326,637, filed on Jul. 9, 2014, which is an application for the reissue of Pat.
(Continued)

(30) Foreign Application Priority Data

Jul. 5, 2006 (KR) ..... 10-2006-0063135

(51) Int. Cl.
*H04W 36/00* (2009.01)
*H04W 74/00* (2009.01)
*H04L 17/00* (2006.01)

(52) U.S. Cl.
CPC ..... *H04W 74/006* (2013.01); *H04L 17/00* (2013.01); *H04W 36/0055* (2013.01)

(58) Field of Classification Search
CPC .... H04W 74/006; H04W 36/0055; H04L 7/00
(Continued)

(56) References Cited

U.S. PATENT DOCUMENTS 5,311,176 A 5/1994 Gurney
5,345,448 A 9/1994 Keskitalo
(Continued)

FOREIGN PATENT DOCUMENTS

CN 1437416 A 8/2003
CN 1505912 6/2004
(Continued)

OTHER PUBLICATIONS

Intention to Grant for European Patent Application No. 06847353.7, dated Jun. 9, 2016.
(Continued)

*Primary Examiner* — Matthew Heneghan
(74) *Attorney, Agent, or Firm* — Jason H. Vick; Sheridan Ross, PC

(57) ABSTRACT

In a wireless mobile communications system, a method of transmitting and receiving radio access information that allows a faster and an efficient way of establishing a radio connection between a terminal and a target base station while performing a handover for the terminal to a cell of the target base station. The network transmits in advance, the radio access information and the like, to the terminal so that the terminal can be connected with the target cell in a faster manner which minimizes the total time for the handover process.

31 Claims, 7 Drawing Sheets

Related U.S. Application Data

No. 8,219,097, which is a continuation of application No. 11/553,939, filed on Oct. 27, 2006, now Pat. No. 7,809,373.

(60) Provisional application No. 60/732,080, filed on Oct. 31, 2005.

(58) Field of Classification Search
USPC ..... 370/331, 338; 455/436, 552.1
See application file for complete search history.

(56) References Cited

U.S. PATENT DOCUMENTS 5,553,153 A 9/1996 Eatwell
5,677,908 A 10/1997 Oura
5,697,055 A 12/1997 Gilhousen et al.
5,722,072 A 2/1998 Crichton et al.
6,161,014 A * 12/2000 Girardeau ..... H04W 36/30 370/331
6,161,160 A 12/2000 Niu et al.
6,359,876 B1 3/2002 Kamata
6,374,080 B2 4/2002 Uchida
6,532,225 B1 3/2003 Chang et al.
6,563,807 B1 5/2003 Kim et al.
6,628,632 B1 9/2003 Dolan
6,628,946 B1 9/2003 Wiberg et al.
6,778,509 B1 * 8/2004 Ravishankar ..... H04B 7/18589 370/322
6,845,238 B1 1/2005 Muller
6,920,155 B2 7/2005 Rao
6,944,453 B2 9/2005 Faerber et al.
6,968,192 B2 11/2005 Longoni
7,047,009 B2 5/2006 Laroia et al.
7,068,625 B1 6/2006 Schindler et al.
7,106,814 B2 * 9/2006 Carsello ..... 375/343
7,200,788 B2 4/2007 Hiraki et al.
7,292,641 B2 11/2007 Suh et al.
7,321,645 B2 1/2008 Lee et al.
7,400,573 B2 7/2008 Sundstrom et al.
7,417,970 B2 8/2008 Shaheen
7,424,067 B2 9/2008 Vanderperren et al.
7,426,175 B2 9/2008 Zhuang et al.
7,433,418 B1 10/2008 Dogan et al.
7,447,504 B2 11/2008 Lohr et al.
7,471,948 B2 12/2008 Farnsworth et al.
7,496,113 B2 2/2009 Cai et al.
7,508,792 B2 3/2009 Petrovic et al.
7,570,618 B2 8/2009 Son et al.
7,580,400 B2 8/2009 Sung et al.
7,590,183 B2 9/2009 Yonge, III et al.
7,593,732 B2 9/2009 Kim et al.
7,599,327 B2 10/2009 Zhuang
7,623,439 B2 11/2009 Webster et al.
7,664,076 B2 2/2010 Kim et al.
7,675,841 B2 3/2010 Suh et al.
7,693,517 B2 4/2010 Etemad et al.
7,693,924 B2 4/2010 Cho et al.
7,701,919 B2 4/2010 Ah Lee
7,702,028 B2 4/2010 Zhou et al.
7,809,373 B2 * 10/2010 Park et al. ..... 455/436
7,961,696 B2 6/2011 Ma et al.
7,983,676 B2 7/2011 Ju et al.
7,995,967 B2 8/2011 Li et al.
8,000,305 B2 8/2011 Tan et al.
8,098,745 B2 1/2012 Bertrand et al.
8,116,195 B2 2/2012 Hou et al.
8,121,045 B2 2/2012 Cai et al.
8,131,295 B2 3/2012 Wang et al.
8,180,058 B2 5/2012 Kitazoe
8,199,730 B2 6/2012 Ou et al.
8,219,097 B2 7/2012 Park et al.
8,340,232 B2 12/2012 Ding et al.
8,412,201 B2 4/2013 Park et al.
8,448,037 B2 5/2013 Bergquist et al.
8,977,258 B2 3/2015 Chou
9,094,202 B2 7/2015 Maheshwari et al.
9,204,468 B2 12/2015 Tynderfeldt et al.
2001/0016496 A1 8/2001 Lee
2001/0026543 A1 * 10/2001 Hwang et al. ..... 370/335
2001/0036113 A1 11/2001 Jurgensen et al.
2002/0045448 A1 4/2002 Park et al.
2002/0048266 A1 4/2002 Choi et al.
2002/0051431 A1 5/2002 Choi et al.
2002/0071480 A1 * 6/2002 Marjelund et al. ..... 375/141
2002/0085516 A1 * 7/2002 Bridgelall ..... 370/329
2002/0089957 A1 7/2002 Viero
2002/0122393 A1 9/2002 Caldwell et al.
2002/0159412 A1 10/2002 Odenwalder et al.
2002/0181436 A1 12/2002 Mueckenheim et al.
2003/0002472 A1 1/2003 Choi et al.
2003/0008653 A1 1/2003 Jiang
2003/0026324 A1 * 2/2003 Li et al. ..... 375/141
2003/0048763 A1 3/2003 Kondo
2003/0054829 A1 3/2003 Moisio
2003/0076812 A1 4/2003 Benedittis
2003/0091108 A1 5/2003 Tanaka
2003/0131300 A1 7/2003 Park et al.
2003/0207696 A1 11/2003 Willenegger et al.
2004/0009767 A1 1/2004 Lee et al.
2004/0022217 A1 2/2004 Korpela et al.
2004/0029532 A1 2/2004 Schwarz et al.
2004/0047284 A1 3/2004 Eidson
2004/0053614 A1 * 3/2004 Il-Gyu et al. ..... 455/436
2004/0085926 A1 5/2004 Hwang et al.
2004/0103435 A1 5/2004 Yi et al.
2004/0114574 A1 6/2004 Zeira et al.
2004/0127244 A1 7/2004 Matsumoto et al.
2004/0152473 A1 8/2004 Kuwano et al.
2004/0152478 A1 8/2004 Ruohonen et al.
2004/0162072 A1 8/2004 Sigle et al.
2004/0171401 A1 9/2004 Balachandran et al.
2004/0185852 A1 9/2004 Son et al.
2005/0041573 A1 2/2005 Eom et al.
2005/0059437 A1 3/2005 Son et al.
2005/0073988 A1 4/2005 Kroth et al.
2005/0075108 A1 4/2005 Cho et al.
2005/0084030 A1 4/2005 Zhou et al.
2005/0105488 A1 5/2005 Raji et al.
2005/0105505 A1 * 5/2005 Fishler et al. ..... 370/349
2005/0107105 A1 5/2005 Wakabayashi
2005/0119004 A1 6/2005 Gao et al.
2005/0122950 A1 6/2005 Ikeda et al.
2005/0138528 A1 6/2005 Arneigeiras et al.
2005/0143072 A1 6/2005 Yoon et al.
2005/0177623 A1 8/2005 Roberts et al.
2005/0181801 A1 8/2005 Funnell
2005/0197132 A1 9/2005 Lee et al.
2005/0213543 A1 9/2005 Shimizu et al.
2005/0213689 A1 9/2005 Matsuda et al.
2005/0227691 A1 10/2005 Pecen et al.
2005/0259567 A1 11/2005 Webster et al.
2005/0271025 A1 * 12/2005 Guethaus et al. ..... 370/342
2005/0272426 A1 12/2005 Yang et al.
2005/0282547 A1 12/2005 Kim et al.
2006/0018336 A1 1/2006 Sutivong et al.
2006/0039327 A1 2/2006 Samuel et al.
2006/0056355 A1 * 3/2006 Love et al. ..... 370/332
2006/0114812 A1 6/2006 Kim et al.
2006/0126570 A1 6/2006 Kim et al.
2006/0274843 A1 12/2006 Koo et al.
2007/0010268 A1 1/2007 Kim et al.
2007/0032255 A1 2/2007 Koo et al.
2007/0058595 A1 3/2007 Classon et al.
2007/0110172 A1 5/2007 Faulkner et al.
2007/0117563 A1 5/2007 Terry et al.
2007/0133458 A1 6/2007 Chandra et al.
2007/0147315 A1 6/2007 Khoury et al.
2007/0155388 A1 7/2007 Petrovic et al.
2007/0253465 A1 11/2007 Muharemovic et al.
2007/0270273 A1 11/2007 Fukuta et al.
2007/0291696 A1 12/2007 Zhang et al.
2007/0291708 A1 12/2007 Rao
2008/0062905 A1 3/2008 Goldberg et al.

(56) References Cited

U.S. PATENT DOCUMENTS

| | | | | |
|---|---|---|---|---|
| 2008/0095119 | A1 | 4/2008 | Bachmann et al. | |
| 2008/0123585 | A1* | 5/2008 | Granzow et al. | 370/320 |
| 2008/0254800 | A1 | 10/2008 | Chun et al. | |
| 2008/0287138 | A1 | 11/2008 | Yoon et al. | |
| 2009/0163211 | A1 | 6/2009 | Kitazoe et al. | |
| 2009/0207810 | A1 | 8/2009 | Petrovic et al. | |

FOREIGN PATENT DOCUMENTS

| | | | |
|---|---|---|---|
| CN | 1596020 | A | 3/2005 |
| EP | 1134992 | | 9/2001 |
| EP | 1326460 | A1 | 7/2003 |
| EP | 1388964 | | 2/2004 |
| EP | 1404079 | | 3/2004 |
| EP | 1469697 | A2 | 10/2004 |
| EP | 1519519 | A1 | 3/2005 |
| EP | 1097602 | | 4/2007 |
| EP | 1968256 | | 9/2008 |
| EP | 1794971 | B1 | 3/2010 |
| EP | 1787414 | B1 | 1/2012 |
| GB | 2332340 | | 12/1997 |
| GB | 2332340 | | 6/1999 |
| JP | 09-186704 | | 7/1997 |
| JP | 10-136426 | | 5/1998 |
| JP | 11-146462 | | 5/1999 |
| JP | 11-196477 | | 7/1999 |
| JP | 11-341541 | | 12/1999 |
| JP | 2000-069531 | | 3/2000 |
| JP | 2001-078246 | | 3/2001 |
| JP | 2001-313968 | | 11/2001 |
| JP | 2003-500950 | | 1/2003 |
| JP | 2003-087842 | | 3/2003 |
| JP | 2003-102055 | | 4/2003 |
| JP | 2003-152600 | | 5/2003 |
| JP | 2003-324761 | | 11/2003 |
| JP | 2004-135287 | | 4/2004 |
| JP | 2004-208177 | | 7/2004 |
| JP | 2004-221760 | | 8/2004 |
| JP | 2004-289234 | | 10/2004 |
| JP | 2005-509313 | | 4/2005 |
| JP | 2005-124215 | | 5/2005 |
| JP | 2005-513907 | | 5/2005 |
| JP | 2005-525065 | | 8/2005 |
| JP | 2005-237031 | | 9/2005 |
| JP | 2005-260337 | | 9/2005 |
| JP | 2005-277570 | | 10/2005 |
| JP | 2006-507753 | | 3/2006 |
| KR | 10-2003-0007481 | | 1/2003 |
| KR | 10-2003-0056143 | | 7/2003 |
| KR | 10-2005-0032285 | | 4/2005 |
| KR | 10-2005-0078635 | | 8/2005 |
| KR | 10-2005-0078636 | | 8/2005 |
| KR | 10-2005-0084908 | | 8/2005 |
| KR | 10-2006-0066595 | | 6/2006 |
| KR | 10-062668 | | 9/2006 |
| KR | 10-0688303 | | 3/2007 |
| KR | 10-2007-0055845 | | 5/2007 |
| KR | 10-2008-0004025 | | 1/2008 |
| RU | 2145774 | | 2/2000 |
| RU | 2149518 | | 5/2000 |
| RU | 2193281 | | 11/2002 |
| RU | 2216100 | | 11/2003 |
| WO | WO 94/08432 | | 4/1994 |
| WO | WO 99/59253 | | 11/1999 |
| WO | WO 00/72609 | | 11/2000 |
| WO | WO 00/74420 | | 12/2000 |
| WO | WO 01/41471 | | 6/2001 |
| WO | WO 01/76110 | | 10/2001 |
| WO | WO 02/09825 | | 2/2002 |
| WO | WO 02/080401 | | 10/2002 |
| WO | WO 02/082666 | | 10/2002 |
| WO | WO 03/017544 | | 2/2003 |
| WO | WO 03/055105 | | 7/2003 |
| WO | WO 03/088691 | | 10/2003 |
| WO | WO 03/096149 | | 11/2003 |
| WO | WO 03/096731 | | 11/2003 |
| WO | WO 03/103320 | | 12/2003 |
| WO | WO 2004/016016 | | 2/2004 |
| WO | WO 2004/017541 | | 2/2004 |
| WO | WO 2004/030392 | | 4/2004 |
| WO | WO 2004/042954 | | 5/2004 |
| WO | WO 2005/011134 | | 2/2005 |
| WO | WO 2005/018255 | | 2/2005 |
| WO | WO 2005/043791 | | 5/2005 |
| WO | WO 2005/060132 | | 6/2005 |
| WO | 2005/078966 | | 8/2005 |
| WO | WO 2005/072073 | | 8/2005 |
| WO | WO 2005/078966 | | 8/2005 |
| WO | WO 2005/083912 | | 9/2005 |
| WO | WO 2005/088882 | | 9/2005 |
| WO | WO 2005/089002 | | 9/2005 |
| WO | WO 2006/023536 | | 3/2006 |
| WO | WO 2007/082409 | | 7/2007 |
| WO | WO 2007/138453 | | 12/2007 |

OTHER PUBLICATIONS

Documents filed with U.S. District Court Proceedings for *Evolved Wireless, LLC* v. *Applie Inc.*; U.S. District Court, for the District of Delaware (Wilmington); Civil Action No. 1:15-cv-00542-SLR-SRF; Includes documents filed from May 17, 2016-Jul. 11, 2016—Docket Nos. 54-67; (4,028 pages).

Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from May 17, 2016-Jul. 11, 2016—Docket Nos. 55-69; (4,029 pages).

Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from May 17, 2016-Jul. 11, 2016; Docket Nos. 49-61; (4,026 pages).

Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from May 26, 2016-Jul. 11, 2016 Docket Nos. 57-77; (4,713 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 1, 2016-Jul. 11, 2016; Docket Nos. 58-70; (4,001 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from May 18, 2016-Jul. 11, 2016—Docket Nos. 58-69; (3,996 pages).

Petition for Inter Partes Review of U.S. Pat. No. 7,809,373, including Exhibits 1001-1019, Case No. IPR2016-01185, filed Jun. 20, 2016 (3,522 pages).

Notice of Filing Date Accorded to Petition and Time for Filing Patent Owner Preliminary Response for *Apple Inc.* v. *Evolved Wireless, LLC*, United States Patent and Trademark Office—Before the Patent Trial and Appeal Board, Case No. IPR 2016-01185, filed Jun. 28, 2016 (5 pages).

Patent Owner's Mandatory Disclosures for *Apple Inc.* v. *Evolved Wireless, LLC*, United States Patent and Trademark Office—Before the Patent Trial and Appeal Board, Case No. IPR 2016-01185, filed Jul. 11, 2016 (9 pages).

Petition for Inter Partes Review of U.S. Pat. No. 7,809,373, including Exhibits 1001-1019, Case No. IPR2016-01347, filed Jul. 5, 2016 (3,520 pages).

Notice of Filing Date Accorded to Petition and Time for Filing Patent Owner Preliminary Response for *Samsung Electronics Co., Ltd. et al.*, v. *Evolved Wireless, LLC*, United States Patent and Trademark Office—Before the Patent Trial and Appeal Board, Case No. IPR 2016-01347, filed Jul. 13, 2016 (5 pages).

(56) References Cited

OTHER PUBLICATIONS

Hearing Notice for Indian Patent Application No. 1324/KOLNP/2008, dated May 27, 2015.
U.S. Appl. No. 14/326,637, filed Jul. 9, 2014, Park et al.
U.S. Appl. No. 14/676,490, filed Apr. 1, 2015, Park et al.
3rd Generation Partnership Project "Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)" 3GPP TR 25.813; V7.0.0 (Jun. 2006).
IEEE Computer Society et al. "IEEE Standard for Local and Metropolitan Area Networks: Part 16: Air Interface for Fixed Broadband wireless Access Systems 802.16" Oct. 2004.
LG Electronics "Functions of E-RRC and E-MAC" TSG-RAN Working Group 2 #48bis, R2-052768, Cannes, France, Oct. 10-14, 2005.
Nokia "Intra-Radio Access Mobility, Handover in LTE_Active" 3GPP TSG-RAN WG2#50, R2-060053; Sophia Antipolis, France, Jan. 8-13, 2006.
Nokia, NTT DoCoMo "Intra-LTE Handover Operation" 3GPP TSG-RAN WG2 Meeting #53, R2-061135, Shanghai, PRC, May 8-13, 2006.
Nokia, NTT DoCoMo "E-UTRA Transport Channels" 3GPP TSG-RAN WG2 Meeting #48bis; R2-052438, Cannes, France; Oct. 10-14, 2005.
NTT DoCoMo "Physical Channel Structures for Evolved UTRA" 3GPP TSG RAN WG1 Meeting #41; R1-050464; Athens, Greece, May 9-13, 2005.
NTT DoCoMo, NEC, Sharp Physical Channels and Multiplexing in Evolved UTRA Downlink: 3GPP TSG RAN WG1 #42 on LTE; R1-050707 (Original R1-050590); London, UK, Aug. 29-Sep. 2, 2005.
Onoe, Seizo et al. "Control Channel Structure for TDMA Mobile Radio Systems" NTT Radio Communication Systems Laboratories; 40th IEEE Vehicular Technology Conference, May 6-9, 1990, Orlando (US), pp. 270-275.
TSG-RAN WG1 #42bis "Multiplexing Method of Shared Control Channel in Uplink Single-Carrier FDMA Radio Access" NTT DoCoMo, Fujitsu, Mitsubishi Electric Corporation, NEC, Panasonic, Sharp, Toshiba Corporation, R1-051143 (Original R1-050591), San Diego, USA, Oct. 10-14, 2005.
Notification of Reason for Refusal (Including Translation) for Korean Application No. 10-2006-0063135, dated Nov. 20, 2009.
Notification of Reason for Final Refusal (Including Translation) for Korean Application No. 10-2006-0063135, dated May 18, 2010.
Decision to Grant (including Translation) for Korean Application No. 10-2006-0063135, dated Aug. 25, 2010.
International Search Report for corresponding International Patent Application No. PCT/KR2006/003697, dated Dec. 20, 2006.
International Preliminary Report on Patentability for corresponding International Patent Application No. PCT/KR2006/003697, dated May 6, 2008.
Examiner's Report for Australian Patent Application No. 2006323560, dated Jun. 3, 2009.
Notice of Acceptance for Australian Patent Application No. 2006323560, dated Aug. 28, 2009.
Notification of First Office Action (including translation) for Chinese Patent Application No. 200680040518.1, dated Mar. 3, 2011.
Notification of Second Office Action (including translation) for Chinese Patent Application No. 200680040518.1, dated May 5, 2011.
Rejection Decision (including translation) for Chinese Patent Application No. 200680040518.1, dated Jul. 28, 2011.
Notice of Decision of Granting Patent Right for Invention (including translation) for Chinese Patent Application No. 200680040518.1, dated Oct. 28, 2011.
European Search Report for European Patent Application No. 06847353.7, dated Dec. 21, 2011.
Communication Pursuant to Rules 70(2) and 70a(2) EPC for European Patent Application No. 06847353.7, dated Jan. 10, 2012.
Office Action for European Patent Application No. 06847353.7, dated Apr. 13, 2015.
Official Action for Indian Patent Application No. 1324/KOLNP/2008, dated Apr. 23, 2014.
Official Action (Including Translation) for Japanese Patent Application No. 2008-533234, dated Oct. 7, 2010.
Notice of Allowance (Including Translation) for Japanese Patent Application No. 2008-533234, dated Jan. 13, 2011.
Official Action (Including Translation) for Mexican Patent Application No. MX/a/2008/004924, dated May 21, 2010.
Notice of Allowance (Including Translation) for Mexican Patent Application No. MX/a/2008/004924, dated Jul. 1, 2010.
Official Action (including translation) for Russian Patent Application No. 2008113180, dated Dec. 1, 2009.
Notice of Allowance (including translation) for Russian Patent Application No. 2008113180, dated Jun. 4, 2010.
Official Letter for Taiwan Patent Application No. 95138124, dated Jan. 28, 2011.
Official Letter and Search Report (including translation) for Taiwan Patent Application No. 95138124, dated Feb. 1, 2011.
Notice of Allowance (including translation) for Taiwan Patent Application No. 95138124, dated Sep. 23, 2011.
Official Action for U.S. Appl. No. 11/553,939, dated Mar. 5, 2009.
Official Action for U.S. Appl. No. 11/553,939, dated Jun. 15, 2009.
Official Action for U.S. Appl. No. 11/553,939, dated Dec. 28, 2009.
Notice of Allowance for U.S. Appl. No. 11/553,939, dated May 28, 2010.
Official Action for U.S. Appl. No. 12/870,747 dated Jan. 25, 2011.
Official Action for U.S. Appl. No. 12/870,747 dated Apr. 19, 2011.
Official Action for U.S. Appl. No. 12/870,747 dated Nov. 10, 2011.
Notice of Allowance for U.S. Appl. No. 12/870,747 dated Apr. 12, 2012.
Supplemental Notice of Allowance for U.S. Appl. No. 12/870,747 dated Jun. 4, 2012.
Official Action for U.S. Appl. No. 13/487,081 dated Aug. 28, 2012.
Notice of Allowance for U.S. Appl. No. 13/487,081 dated Jan. 4, 2013.
Ex Parte Quayle Action for U.S. Appl. No. 14/326,637 dated Mar. 25, 2015.
U.S. Appl. No. 60/759,697, filed Jan. 17, 2006, Tan et al.
U.S. Appl. No. 60/815,246, filed Jun. 19, 2006, Zhang et al.
U.S. Appl. No. 60/815,023, filed Jun. 20, 2006, Chandra et al.
U.S. Appl. No. 60/015,159, filed Dec. 19, 2007, Kitazoe et al.
3GPP Meeting Registration; Meeting: RAN2#62; Kansas City; May 5, 2008 (6 pages).
3GPP Meeting Registration; Meeting; 3GPPRAN1#44-bis; Mar. 12, 2016 (6 pages).
3GPP TSG RAN WG1 Ad Hoc on LTE "On Allocation of Uplink Pilot Sub-Channels in EUTRA SC-FDMA" London, UK; R1-050822; Aug. 29-Sep. 2, 2005; (7 pages).
3GPP TSG RAN WG1 Ad Hoc on LTE "On Uplink Pilot in EUTRA SC-FDMA" San Diego, USA; R1-051062; Oct. 10-14, 2005 (7 pages).
3GPP TSG-RAN WG2 "Access Procedure" Shanghai, China; R2-061201; May 8-12, 2006 (3 pages).
3GPP TSG RAN WG1 #42 on LTE "Orthogonal Pilot Channel in the Same Node B in Evolved UTRA Uplink" London, UK; R1-050851; Aug. 29-Sep. 2, 2005; (9 pages).
3GPP TSG RAN1 #44 "RACH Design for EUTRA" Denver, USA; R1-060387; Feb. 13-17, 2006 (11 pages).
3GPP TSG RAN1 #44 "RACH Design for EUTRA" Denver, USA; R1-060387; Marked-Up; Feb. 13-17, 2006 (11 pages).
3GPP TSG RAN WG1 #44 "Some Consideration for LTE Rach 13.2.3.1" Denver, USA; R1-060531; Feb. 13-17, 2006 (4 pages).
3GPP TSG WG1 Meeting #44bis "RACH Design for E-UTRA" R1-060797; Athens, Greece, Mar. 27-31, 2006 (9 pages_.
3GPP TSG RAN1 #44-bis "Random Access Sequence Design" R1-060884; Athens, Greece, Mar. 24-26, 2006 (7 pages).
3GPP TSG-RAN WG3 #48 bis meeting "On Intra-Access Mobility for LTE_Active UEs" Cannes, France; R3-051108; Oct. 11-14, 2005 (4 pages).
3GPP TSG-RAN WG2 #50 "Intra-System Mobility" Sophia-Antipolis, France; R2-060013; Jan. 9-13, 2006 (7 pages).

(56) References Cited

OTHER PUBLICATIONS

3GPP TSG RAN WG2 #52 "Mobility in LTE Active" Athens, Greece; Tdoc R2-060915; Mar. 27-31, 2006 (4 pages).
3GPP TSG-RAN WG2 Meeting #53 "Cell Switching in LTE_Active State" Shanghai, China; R2-061196; May 8-12, 2006 (5 pages).
3GPP TSG-RAN WG1 Meeting #53 "UL Grant for Random Access Message 3" R1-082078; Kansas City, USA; May 5-9, 2008 (4 pages).
3GPP TSG-RAN WG2 Meeting #53 "Intra-LTE Handover Operation" Shanghai, PRC; R2-061135; May 8-13, 20016 (3 pages).
3GPP TSG-RAN WG3 #53bis "Intral-LTE Mobility Procedure" Seoul, Korea; R3-061489; Oct. 10-13, 2006 (4 pages).
3GPP TSG RAN WG2 #57 "Uplink Synchronization" R2-070781; St. Louis, USA; Feb. 12-16, 2007 (3 pages).
3GPP TSG-RAN WG2 #61 bis "Control of HARQ for RACH message 3" R2-081764; Shenzhen, China; Mar. 31-Apr. 4, 2008 (5 pages).
3GPP TSG-RAN2 Meeting #62bis "Clarification of DL- and UL-SCH Data Transfer" Warsaw, Poland, R2-083400; Marked-Up; Jun. 30-Jul. 4, 2008 (7 pages).
3GPP TSG-RAN2 Meeting #62bis "Clarification of DL- and UL-SCH Data Transfer" Warsaw, Poland, R2-083701 (revision of R2-083400); Marked-Up; Jun. 30-Jul. 4, 2008 (8 pages).
3GPP TSG-RAN2 Meeting #62bis "NDI and Msg3" Warsaw, Poland, R2-083703; Marked-Up; Jun. 30-Jul. 4, 2008 (3 pages).
3GPP TSG-RAN2 Meeting #63 "Corrections Relating to RACH Partitioning" Jeju, Korea; R2-084788; Aug. 18-22, 2008; (4 pages).
3GPP TSG-RAN WG2 #63 "PCCH Configuration in SIB1" Jeju, Korea; R2-083882; Aug. 18-22, 2008; (4 pages).
3GPP TSG-RAN WG2 Meeting #64bis "Clarification on RA Preambles" Athens, Greece; R2-091523; Jan. 9-13, 2009 (3 pages).
3GPP TSG-RAN WG2 Meeting #64bis "Clarification on RA Preambles" Athens, Greece; R2-091523; Marked-Up; Jan. 9-13, 2009 (3 pages).
3GPP TS 25.302 V6.5.0 "3rd Generation Partnership Project; Technical Specification Group Radio Access Network; Services Provided by the Physical Layer (Release 6)" Sep. 2005 (75 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"; Oct. 2005 (17 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"—Marked-Up; Oct. 2005 (18 pages).
3GPP TR 25.814 V0.3.1 "3rd Generation Partnership Project; Technical Specification Group Radio Access Network; Physical Layer Aspects for Evolved UTRA (Release 7)" Oct. 2005 (51 pages).
3GPP TR 25.912 V7.0.0 "3rd Generation Partnership Project; Technical Specification Group Radio Access Network; Feasibility Study for Evolved Universal Terrestrial Radio Access (UTRA) and Universal Terrestrial Radio Access Network (E-UTRAN) (Release 7)" Jun. 2006 (55 pages).
3GPP TS 36.300 V8.5.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" May 2008 (134 pages).
3GPP TS 36.300 V8.7.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2008 (144 pages).
3GPP TS 36.300 V8.8.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2009 (156 pages).
3GPP TS 36.300 V0.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (87 pages).
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (33 pages).
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (32 pages).
3GPP TS 36.321 V8.3.0 "3rd Generation Partnership Project; Technical Specification Group Radio Access Network; Evolved Universal Terrestrial Radio Access (E-UTRA) Medium Access Control (MAC) Protocol Specification (Release 8)" Sep. 2008 (36 pages).
Chu, David C. "Polyphase Codes with Good Periodic Correlation Properties" Information Theory IEEE Transaction on, vol. 18, Issue 4, pp. 531-532, Jul. 1972).
Ericsson "Clarification of DL- and UL-SCH Data Transfer" 3GPP TSG-RAN2 Meeting #62bis; R2-0837271 Warsaw, Poland; Jun. 30-Jul. 4, 2008 (7 pages).
ETSI TS 101 475 V1.3.1 "Broadband Radio Access Networks (BRAN); HIPERLAN Type 2; Physical (PHY) Layer" Dec. 2001 (43 pages).
ETSI TS 101 761-1 V1.3.1 "Broadband Radio Access Networks (BRAN); HIPERLAN Type 2; Data Link Control (DLC) Layer; Part 1: Basic Data Transport Functions" Dec. 2001 (88 pages).
ETSI TS 136 321 V8.2.0 "LTE; Evolved Universal Terrestrial Radio Access (E-UTRA); Medium Access Control (MAC) Protocol Specification (3GPP TS 36.321 Version 8.2.0 Release 8)" Nov. 2008 (35 pages).
IEEE "IEEE 802.16e Handoff Draft" IEEE C802.16e-03/20rl; Mar. 13, 2003 (22 pages).
IEEE "IEEE 802.16 Standard for Local and Metropolitan Area Networks: Part 16: Air Interface for Fixed Broadband Wireless Access Systems" Oct. 1, 2004 (895 pages).
IEEE "Signaling Methodologies to Support Closed-Loop Transmit Processing in TDD-OFDMA"{ IEEE C802.16e-04/103r2; Jul. 7, 2004 (35 pages).
IEEE "Draft IEEE Standard for Local and Metropolitan Area Networks: Part 16: Air Interface for Fixed and Mobile Broadband Wireless Access Systems" IEEE P802.16e/D12, Oct. 14, 2005 (684 pages).
IEEE "IEEE Standard for Local and Metropolitan Area Networks: Part 16: Air Interface for Fixed and Mobile Broadband Wireless Access Systems; Amendment 2: Physical and Medium Access Control Layers for Combined Fixed and Mobile Operation in Licensed Bands" IEEE P802.16e-2005; Feb. 28, 2006 (864 pages).
Joint RAN2-RAN3 #48bis LTE "EUTRAN Handover Procedure for LTE_Active" Cannes, France; TSGR3(05)1106; Oct. 11-14, 2005 (3 pages).
Nuaymi, Loutfi "WiMAX: Technology for Broadband Wireless Access" John Wiley & Sons, Ltd., 2007 (286 pages).
Sesia, Stefania "LTE: The UMTS Long Term Evolution: From Theory to Practice" Second Edition; Wiley; 2011 (794 pages).
TSG-RAN Meeting #41 "REL-8 CRs for LTE to TS 36.321 MAC" Kobe, Japan; RP-080690; Sep. 9-12, 2008; (3 pages).
TSG-RAN Meeting # 43 "RAN2 REL-8 CRs for LTE to TS 36.300" Biarritz, France; RP-090123; Mar. 3-6, 2009 (1 page).
TSG-RAN WG1 Meeting #44 "RACH Preamble Evaluation in E-UTRA Uplink" Denver, USA; R1-060700; Feb. 13-17, 2006 (5 pages).
TSG-RAN WG1 Meeting #44bis "Random Access Burst Evaluation in E-UTRA Uplink" Athens, Greece; R1-060792I Mar. 27-31, 2006 (8 pages).
TSG-RAN WG1 Meeting #45 "Random Access Design for E-UTRA Uplink" Shanghai, China; R1-061114; May 8-12, 2006 (5 pages).

(56) References Cited

OTHER PUBLICATIONS

TSG-RAN WG1 Meeting #45 "Random Access Design for E-UTRA Uplink" Shanghai, China; R1-061114; Marked-Up; May 8-12, 2006 (6 pages).
TSG-RAN WG1 #46 "E-UTRA Scalability of Random Access Preamble with Cyclic Prefix" Tallinn, Estonia; R1-062274; Aug. 28-Sep. 1, 2006 (8 pages).
Wu, Yik-Chung et al. "Maximum-Likelihood Symbol Synchronization for IEEE 802.11a WLANs in Unknown Frequency-Selective Fading Channels" IEEE Transactions on Wireless Communications, vol. 4, No. 6, Nov. 2005 (123 pages).
Office Action for European Patent Application No. 06847353.7, dated Feb. 26, 2016.
Defendants' Initial Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Mar. 14, 2016 (1244 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 25, 2015-May 13, 2016 Docket Nos. 1-53; (1259 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 25, 2015-May 13, 2016 Docket Nos. 1-54; (1369 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Jun. 25, 2015-May 13, 2016 Docket Nos. 1-48; (993 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jun. 25, 2015-May 17, 2016 Docket Nos. 1-56; (1202 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 25, 2015-May 17, 2016 Docket Nos. 1-57; (1203 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 25, 2015-May 17, 2016 Docket Nos. 1-57; (1273 pages).
U.S. Appl. No. 60/599,916, filed Aug. 10, 2004, Olfat et al.
U.S. Appl. No. 60/666,494, filed Mar. 30, 2005, Classon et al.
U.S. Appl. No. 60/732,080, filed Oct. 31, 2005, Lee et al.
U.S. Appl. No. 61/087,307, filed Aug. 8, 2008, Meylan et al.
U.S. Appl. No. 61/087,988, filed Aug. 11, 2008, Yi et al.
U.S. Appl. No. 61/088,257, filed Aug. 12, 2008, Meylan et al.
3GPP RAN 1 Meeting #44-bis "On the Performances of LTE RACH" Athens, Greece; Mar. 27-31, 2006; R1-060908; 6 pages.
3GPP TSG-RAN Working Group 2 Meeting #52 "Intra-RAT Handover Access Procedure" Shanghai, China; May 8-12, 2006; R2-061229 (4 pages).
3GPP TSG RAN WG1 #44-bis "A New Preamble Shape for the Random Access Preamble in E-UTRA" Athens, Greece, Mar. 27-31, 2006; R1-060867; 5 pages.
3GPP TSG-RAN WG1 Meeting #44bis "Investigations on Random Access Channel Structure for E-UTRA Uplink" Athens, Greece; Mar. 27-31, 2006; R1-060992; 7 pages.
3GPP TSG-RAN WG3 #54 "Updates of Intra-LTE Handover in 36.300" Riga, Latvia Nov. 6-10, 2006; R3-061788; 6 pages.
3GPP TSG-RAN WG3 #54 "Updates of Intra-LTE Handover in 36.300" Riga, Latvia Nov. 6-10, 2006; R3-061945; 10 pages.
3GPP TSG RAN1 #43 "RACH Design for EUTRA" Helsinki, Finland; Jan. 23-25, 2006; R1-060025; 11 pages.
3GPP TSG-RAN WG2 #63 "NDI and Message 3" Jeju Island, Korea; Aug. 18-22, 2008; R2-084156; 5 pages.
3GPP TSG-RAN WG2 #63 "Handling of Received UL Grant in RA Procedure" Jeju, South Korea; Aug. 18-22, 2008; R2-084387; 3 pages.
3GPP TSG-RAN2 Meeting #59bis "E-UTRA RRC TP Capturing Current Status on Mobility" Shanghai, P.R. China; Oct. 8-12, 2007; R2-074014 (11 pages).
3GPP TSG RAN2 Meeting #63 "Handling of Received UL Grant in RA Procedure" Jeju, South Korea; Aug. 18-22, 2008; Marked-Up; R2-084388; 4 pages.
3GPP TS 25.201 V3.0.0 (Oct. 1999) "3rd Generation Partnership Project; Technical Specification Group Radio Access Network; Physical Layer—General Description (3G TS 25.201 Version 3.0.0)" Oct. 1999; 13 pages.
3GPP TS 25.211 V6.6.0 (Sep. 2005) "3rd Generation Partnership Project; Technical Specification Group Radio Access Network; Physical Channels and Mapping of Transport Channels onto Physical Channels (FDD) (Release 6)" Sep. 2005; 50 pages.
3GPP TS 25.211 V6.7.0 (Dec. 2005) "3rd Generation Partnership Project; Technical Specification Group Radio Access Network; Physical Channels and Mapping of Transport Channels onto Physical Channels (FDD) (Release 6)" Dec. 2005; 50 pages.
3GPP TS 25.213 V6.4.0 (Sep. 2005) "3rd Generation Partnership Project; Technical Specification Group Radio Access Network; Spreading and Modulation (FDD) (Release 6)" Sep. 2005; 32 pages.
3GPP TR 21.900 V8.2.0 (Mar. 2008) "3rd Generation Partnership Project; Technical Specification Group Services and System Aspects; Technical Specification Group Working Methods (Release 8)" Mar. 2008; 34 pages.
3GPP TR 25.814 V1.0.2 (Jan. 2006) "3rd Generation Partnership Project; Technical Specification Group Radio Access Network; Physical Layer Aspects for Evolved UTRA (Release 7)" Marked-Up; Jan. 2006; 79 pages.
3GPP TR 25.905 V7.0.0 (Dec. 2006) "3rd Generation Partnership Project; Technical Specification Group Radio Access Network; Improvement of the Multimedia Broadcast Multicast Service (MBMS) in UTRAN (Release 7)" Dec. 2006; 41 pages.
3GPP TS 36.101 V8.2.0 (May 2008) "3rd Generation Partnership Project; Technical Specification Group Radio Access Network; Evolved Universal Terrestrial Radio Access (E-UTRA); User Equipment (UE) Radio Transmission and Reception (Release 8)" May 2008; 66 pages.
3GPP TS 36.211 V8.0.0 (Sep. 2007) "3rd Generation Partnership Project; Technical Specification Group Radio Access Network; Evolved Universal Terrestrial Radio Access (E-UTRA); Physical Channels and Modulation (Release 8)" Sep. 2007; 50 pages.
3GPP TS 36.213 V8.3.0 (May 2008) "3rd Generation Partnership Project; Technical Specification Group Radio Access Network; Evolved Universal Terrestrial Radio Access (E-UTRA); Physical Layer Procedures (Release 8)" May 2008; 45 pages.
3GPP TS 36.300 V8.0.0 (Mar. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2007; 82 pages.
3GPP TS 36.300 V8.1.0 (Jun. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2007 (106 pages).
3GPP TS 36.300 V8.2.0 (Sep. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2007; 109 pages.
3GPP TS 36.300 V8.3.0 (Dec. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2007; 121 pages.

(56) References Cited

OTHER PUBLICATIONS

3GPP TS 36.300 V8.4.0 (Mar. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2008; 126 pages.
3GPP TS 36.300 V8.6.0 (Sep. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2008 (137 pages).
3GPP TS 36.300 V8.9.0 (Jun. 2009) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2009 (159 pages).
3GPP TS 36.300 V0.9.0 (Marked-Up) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (87 pages).
3GPP TS 36.300 V0.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (81 pages).
3GPP TS 36.321 V8.1.0. "3rd Generation Partnership Project; Technical Specification Group Access Network; Evolved Universal Terrestrial Radio Access (E-UTRA) Medium Access Control (MAC) protocol specification" (Release 8) 30 pages, Mar. 2008.
3GPP TS 36.331 V8.0.0 (Dec. 2007) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2007 (56 pages).
3GPP TS 36.331 V8.1.0 (Mar. 2008) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2008 (122 pages).
3GPP TS 36.331 V8.2.0 (May 2008) "3rd Generation Partnership Project; Technical Specification Group Radio Access Network; Evolved Universal Terrestrial Radio Access (E-UTRA) Radio Resource Control (RRC); Protocol Specification (Release 8)" May 2008 (151 pages).
3GPP TS 36.331 V8.3.0 (Sep. 2008) "3rd Generation Partnership Project; Technical Specification Group Radio Access Network; Evolved Universal Terrestrial Radio Access (E-UTRA) Radio Resource Control (RRC); Protocol Specification (Release 8)" Sep. 2008 (178 pages).
3GPP TS 36.331 V8.4.0 (Dec. 2008) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2008 (198 pages).
3GPP TS 36.331 V8.5.0 (Mar. 2009) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2009 (204 pages).
3GPP TS 36.331 V8.6.0 (Jun. 2009) "3rd Generation Partnership Project; Technical Specification Group Radio Access Network; Evolved Universal Terrestrial Radio Access (E-UTRA) Radio Resource Control (RRC); Protocol Specification (Release 8)" Jun. 2009 (207 pages).
Abramson, Norman "The Aloha System—Another Alternative for Computer Communications" University of Hawaii; Honolulu, Hawaii; Fall Joint Computer Conference, 1970; 6 pages.
Dahlman, Erik "3G Evolution HSPA and LTE for Mobile Broadband" Academic Press; 2007; 18 pages.
Holma, Harri et al. "WCDMA for UMTS: Radio Access for Third Generation Mobile Communications" 3rd Edition; Wiley; 2004; 481 pages.
IEEE "Minutes of IEEE 802.16 Session #38" IEEE 802.16 Broadband Wireless Access Working Group; Aug. 25, 2005 (44 pages).
Natarajan, Balasubramaniam et al. "High-Performance MC-CDMA Via Carrier Interferometry Codes" IEEE Transactions on Vehicular Technology, Vo. 60, No. 6, Nov. 2001; 10 pages.
Popovic, Branislav M. "Generalized Chirp-Like Polyphase Sequences with Optimum Correlation Properties" IEEE Transactions on Information Theory, vol. 38, No. 4. Jul. 1992 (4 pages).
Tsai, Shang Ho et al. "MAI-Free MC-CDMA Systems Based on Hadamard-Walsh Codes" IEEE Transactions on Signal Processing, vol. 54, No. 8, Aug. 2006 (14 pages).
TSG-RAN Working Group 1 Meeting #6 "Proposal for RACH Preambles" Espoo, Finland; Jul. 13-16, 1999; 3GPP/TSGR1#6(99)893; 26 pages.
TSG-RAN WG1 #43 E-UTRA Random Access: Seoul, Korea; Nov. 7-11, 2005; R1-051445; 4 pages.
TSG-RAN Working Group 1 Meeting #63bis "Report of 3GPP TSG RAN WG2 Meeting #63" Prague, Czech Republic; Oct. 18-22, 2008; R2-085971; 156 pages.
Defendants' Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Feb. 28, 2017 (3,140 pages).
Documents filed with U.S. District Court Proceedings for *Evolved Wireless, LLC* v. *Apple Inc.*; U.S. District Court, for the District of Delaware Wilmington); Civil Action No. 1:15-cv-00542-SLR-SRF; Includes documents filed from Jan. 25, 2017-Mar. 17, 2017; Docket Nos. 123-145; (176 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jan. 25, 2017-Mar. 17, 2017; Docket Nos. 130-151; (161 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Jan. 25, 2017-Mar. 17, 2017; Docket Nos. 118-135; (103 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jan. 24, 2017-Mar. 17, 2017; Docket Nos. 147 -168; (107 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jan. 25, 2017-Mar. 17, 2017; Docket Nos. 128-153; (135 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jan. 25, 2017-Mar. 17, 2017; Docket Nos. 134-151; (98 pages).
European Search Report for European Patent Application No. 16002537, dated Mar. 20, 2017.
Documents filed with U.S. District Court Proceedings for *Evolved Wireless, LLC* v. *Applie Inc.*; U.S. District Court, for the District of Delaware (Wilmington); Civil Action No. 1:15-cv-00542-SLR-SRF; Includes documents filed from Jul. 15, 2016-Aug. 19, 2016—Docket Nos. 68-76; (308 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jul. 15, 2016-Aug. 19, 2016—Docket Nos. 70-81; (336 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-

(56) References Cited

OTHER PUBLICATIONS

00544-SLR-SRF; Includes documents filed from Jul. 15, 2016-Aug. 19, 2016; Docket Nos. 62-71; (310 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jul. 15, 2016-Aug. 19, 2016; Docket Nos. 78-91; (354 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jul. 15, 2016-Aug. 19, 2016; Docket Nos. 71-79; (308 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jul. 15, 2016-Aug. 19, 2016—Docket Nos. 70-78; (305 pages).
Patent Owner's Mandatory Disclosures for *Samsung Electronics Co., Ltd. et al.*, v. *Evolved Wireless, LLC*, United States Patent and Trademark Office—Before the Patent Trial and Appeal Board, Case No. IPR 2016-01347, submitted Aug. 4, 2016 (9 pages).
Non-Final Office Action for U.S. Appl. No. 14/326,637 dated May 12, 2017.
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Mar. 20, 2017-May 30, 2017; Docket Nos. 146-157; (175 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Mar. 22, 2017-May 30, 2017; Docket Nos. 152-163; (172 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Mar. 20, 2017-May 30, 2017; Docket Nos. 136-147; (179 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Mar. 21, 2017-May 30, 2017; Docket Nos. 169-183; (185 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Mar. 20, 2017-May 30, 2017; Docket Nos. 154-165; (178 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Mar. 21, 2017-May 30, 2017; Docket Nos. 151-165; (176 pages).
Decision—Denying Request for Rehearing for *Apple Inc.* v. *Evolved Wireless, LLC*, United States Patent and Trademark Office—Before the Patent Trial and Appeal Board, Case No. IPR 2016-01185, filed Apr. 17, 2017 (8 pages).
Petitioner's Request for Refund of Post-Institution Fees for *Apple Inc.* v. *Evolved Wireless, LLC*, United States Patent and Trademark Office—Before the Patent Trial and Appeal Board, Case No. IPR 2016-01185, filed Apr. 21, 2017 (3 pages).
Notice of Refund for *Apple Inc.* v. *Evolved Wireless, LLC*, United States Patent and Trademark Office—Before the Patent Trial and Appeal Board, Case No. IPR 2016-01185, filed May 1, 2017 (2 pages).
Petitioner's Updated Mandatory Notice Under 37 C.F.R. § 42.8(b)(3) for *Samsung Electronics Co., Ltd. et al.*, v. *Evolved Wireless, LLC*, United States Patent and Trademark Office—Before the Patent Trial and Appeal Board, Case No. IPR 2016-01347, submitted Apr. 7, 2017 (4 pages).
Decision—Denying Request for Rehearing—37 C.F.R. § 42.71(d) for *Samsung Electronics Co., Ltd. et al.*, v. *Evolved Wireless, LLC*, United States Patent and Trademark Office—Before the Patent Trial and Appeal Board, Case No. IPR 2016-01347, submitted Apr. 17, 2017 (8 pages).
Written Opinion for corresponding International Patent Application No. PCT/KR2006/003697, dated Dec. 20, 2006.
Official Action (Including Translation) for Japanese Patent Application No. 2008-533234, dated Dec. 13, 2010.
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Nov. 9, 2016-Dec. 12, 2016; Docket Nos. 109-119; (212 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Nov. 9, 2016-Dec. 7, 2016; Docket Nos. 115-125; (212 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Nov. 9, 2016-Dec. 7, 2016; Docket Nos. 103-113; (212 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Nov. 9, 2016-Dec. 7, 2016; Docket Nos. 127-139; (220 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Nov. 9, 2016-Dec. 7, 2016; Docket Nos. 114-124; (212 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Nov. 9, 2016-Dec. 14, 2016—Docket Nos. 114-129; (129 pages).
Office Action for European Patent Application No. 16002537, dated Apr. 10, 2017.
3GPP Meeting Registration; Meeting: 3GPPRAN1#44; Mar. 10, 2016 (7 pages).
3GPP Meeting Registration; Meeting: 3GPPRAN1#44-bis; Mar. 12, 2016 (6 pages).
3GPP Meeting Registration; Meeting: 3GPPRAN2#62-bis; Mar. 12, 2016 (6 pages).
3GPP TSG-RAN WG2 #62 "Update of MAC Random Access Procedure" Tdoc R2-082731; Kansas City, USA; May 5-9, 2008 (7 pages).
Non-Final Office Action for U.S. Appl. No. 14/326,637 dated Aug. 25, 2016.
Non-Final Office Action for U.S. Appl. No. 14/676,490 dated Sep. 21, 2016.
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 23, 2016-Nov. 8, 2016 Docket Nos. 77-108; (785 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 23, 2016-Nov. 8, 2016; Docket Nos. 82-114; (702 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Aug. 23, 2016-Nov. 8, 2016; Docket Nos. 72-102; (740 pages).
Documents filed with U.S. District Court Proceedings for *Evolved Wireless, LLC* v. *Samsung Electronics Co. Ltd., et al.*; U.S. District

(56) References Cited

OTHER PUBLICATIONS

Court, for the District of Delaware (Wilmington); Civil Action No. 1:15-cv-00545-SLR-SRF; Includes documents filed from Aug. 23, 2016-Nov. 8, 2016; Docket Nos. 92-126; (775 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 23, 2016-Nov. 8, 2016; Docket Nos. 80-113; (733 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 24, 2016-Nov. 8, 2016—Docket Nos. 79-113; (796 pages).
Patent Owner's Preliminary Response for *Apple Inc.* v. *Evolved Wireless, LLC*, United States Patent and Trademark Office—Before the Patent Trial and Appeal Board, Case No. IPR 2016-01185, filed Sep. 28, 2016 (149 pages).
Patent Owner's Preliminary Response for *Samsung Electronics Co., Ltd. et al.*, v. *Evolved Wireless, LLC*, United States Patent and Trademark Office—Before the Patent Trial and Appeal Board, Case No. IPR 2016-01347, submitted Oct. 13, 2016 (156 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Dec. 27, 2016-Jan. 17, 2017; Docket Nos. 120-122; (9 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Dec. 27, 2016-Jan. 17, 2017; Docket Nos. 126-129; (11 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Dec. 27, 2016-Jan. 23, 2017; Docket Nos. 114-117; (11 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Dec. 27, 2016-Jan. 23, 2017; Docket Nos. 140-146; (17 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Dec. 27, 2016-Jan. 17, 2017; Docket Nos. 125-127; (9 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Dec. 19, 2016-Jan. 17, 2017; Docket Nos. 130-133; (11 pages).
Decision Denying Institution of Inter Partes Review 37 C.F.R. 42.108 for *Apple Inc.* v. *Evolved Wireless, LLC*, United States Patent and Trademark Office—Before the Patent Trial and Appeal Board, Case No. IPR 2016-01185, filed Dec. 19, 2016 (18 pages).
Petitioner's Request for Rehearing Pursuant to 37 C.F.R. 42.71 for *Apple Inc.* v. *Evolved Wireless, LLC*, United States Patent and Trademark Office—Before the Patent Trial and Appeal Board, Case No. IPR 2016-01185, filed Jan. 18, 2017 (17 pages).
Decision Denying Institution of Inter Partes Review 37 C.F.R. 42.108 for *Samsung Electronics Co., Ltd. et al.*, v. *Evolved Wireless, LLC*, United States Patent and Trademark Office—Before the Patent Trial and Appeal Board, Case No. IPR 2016-01347, submitted Dec. 19, 2016 (19 pages).
Petitioner's Request for Rehearing Pursuant to 37 C.F.R. 42.71 for *Samsung Electronics Co., Ltd. et al.*, v. *Evolved Wireless, LLC*, United States Patent and Trademark Office—Before the Patent Trial and Appeal Board, Case No. IPR 2016-01347, submitted Jan. 18, 2017 (17 pages).
Final Office Action for U.S. Appl. No. 14/676,490 dated Jul. 10, 2017.
Notice of Allowance for U.S. Appl. No. 14/676,490 dated Aug. 21, 2017.
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 14, 2017-Aug. 25, 2017; Docket Nos. 158-189; (257 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 5, 2017-Aug. 25, 2017; Docket Nos. 164-201; (278 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Jun. 14, 2017-Aug. 25, 2017; Docket Nos. 148-179; (264 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Jun. 14, 2018-Aug. 25, 2017; Docket Nos. 184-221; (281 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 14, 2017-Aug. 25, 2017; Docket Nos. 166-193; (254 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 5, 2017-Aug. 25, 2017; Docket Nos. 166-192; (155 pages).
Notice of Allowance for U.S. Appl. No. 14/326,637 dated Sep. 26, 2017.
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 31, 2017-Oct. 5, 2017; Docket Nos. 190-219; (307 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 31, 2017-Oct. 5, 2017; Docket Nos. 203-232; (352 pages).
Documents filed with U.S. District Court Proceedings for *Evolved Wireless, LLC* v. *Lenovo Group Ltd., et al.*; U.S. District Court, for the District of Delaware (Wilmington); Civil Action No. 1:15-cv-00544-SLR-SRF; Includes documents filed from Aug. 31, 2017-Oct. 3, 2017; Docket Nos. 180-207; (255 pages).
Documents filed with U.S. District Court Proceedings for *Evolved Wireless, LLC* v. *Samsung Electronics Co. Ltd., et al.*; U.S. District Court, for the District of Delaware (Wilmington); Civil Action No. 1:15-cv-00545-SLR-SRF; Includes documents filed from Aug. 31, 2018-Sep. 28, 2017; Docket Nos. 222-244; (241 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 31, 2017-Sep. 28, 2017; Docket Nos. 194-218; (244 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 31, 2017-Sep. 28, 2017; Docket Nos. 193-218; (232 pages).
NTT DoCoMo, et al, "Multiplexing Method of Shared Control Channel in Uplink Single-Carrier FDMA Radio Access," TSG-RAN WG1#42bis, R1-051143, Oct. 10, 2005.
LG Electronics, "Functions of E-RRC and E-MAC," TSG-RAN Working Group 2 #48bis, R2-052768, Oct. 10, 2005.
IEEE Standard, "Part 16: Air Interface for Fixed Broadband Wireless Access Systems," IEEE Std 802.16, Oct. 2004.

(56) References Cited

OTHER PUBLICATIONS

3rd Generation Partnership Project (3GPP); "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7 .0.0, Jun. 2006.
Nokia, "Intra-radio access mobility, Handover in LTE_ACTIVE", R2-060053, 3GPP TSG-RAN WG2#50, Jan. 2006.
Nokia et al., "Intra_LTE Handover Operation", R2-061135, 3GPP TSG-RAN WG2 Meeting#53, May 2006.
NTT DoCoMo et al., "Physical Channels and Multiplexing in Evolved UTRA Downlink", R1-050707, 3GPP TSG RAN WG1 #42 on LTE, Aug. 2005.
NTT DoCoMo, "Physical Channel Structures for Evolved UTRA", R1-050464, 3GPP TSG RAN WG1 Meeting #41, May 2005.
Nokia et al., "E-UTRA Transport Channels", R2-052438, 3GPP TSG-RAN WG2 Meeting#48bis, Oct. 2005.

* cited by examiner

METHOD OF TRANSMITTING AND RECEIVING RADIO ACCESS INFORMATION IN A WIRELESS MOBILE COMMUNICATIONS SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *divisional of U.S. patent application Ser. No. 14/326,637, filed Jul. 9, 2014, which is a broadening Reissue of U.S. patent application Ser. No. 12/870,747, filed Aug. 27, 2010, now U.S. Pat. No. 8,219,097, which is a* continuation of U.S. application Ser. No. 11/553,939, filed Oct. 27, 2006, now U.S. Pat. No. 7,809,373, which claims the benefit of earlier filing date and right of priority to U.S. Provisional Application No. 60/732,080, filed Oct. 31, 2005, and Korean Patent Application No. 10-2006-0063135, filed Jul. 5, 2006, the contents of which are hereby incorporated by reference herein in their entirety.

FIELD OF THE INVENTION

The present invention relates to wireless (radio) mobile communications systems, and in particular, relates to a method of transmitting and receiving radio connection information that allows a terminal to access a target base station (i.e., target eNB) in a faster and more efficient manner while performing a handover for the terminal to a cell of the target base station.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or terminal, a UMTS Terrestrial Radio Access Network (UTRAN), and a core network (CN). The UTRAN comprises at least one Radio Network Su-bsystem (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows.

The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control (RLC) layer with a service through a logical channel. The RLC layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods.

A RRC connection and a signaling connection will be described in more detail as follows.

In order to perform communications, a terminal needs to have a RRC connection with the UTRAN and a signaling connection with the Core Network (CN). The terminal transmits and/or receives a terminal's control information with the UTRAN or the CN via the RRC connection and the signaling connection.

FIG. 3 shows an exemplary diagram for explaining how a RRC connection is established.

In FIG. 3, to establish the RRC connection, the terminal transmits a RRC Connection Request Message to the RNC, and then the RNC transmits a RRC Connection Setup Message to the terminal in response to the RRC Connection Request Message. After receiving the RRC Connection Setup Message by the terminal, the terminal transmits a RRC Connection Setup Complete Message to the RNC. If the above steps are successfully completed, the terminal establishes the RRC connection with the RNC. After the RRC connection is established, the terminal transmits an Initial Direct Transfer (IDT) message to the RNC for initializing a process of the signaling connection.

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel.

FIG. 4 shows how the physical random access channel (PRACH) power ramping and message transmission may be performed.

Referring to FIG. 4, the PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

FIG. 5 illustrates an exemplary structure of an Acquisition Indicator Channel (AICH).

As shown in FIG. 5, the AICH, which is a downlink physical channel, transmits 16 symbol signatures (Si, i=0, . . . , 15) for the access slot having a length of 5120 chips. The terminal may select any arbitrary signature (Si) from S0 signature to S15 signature, and then transmits the selected signature during the first 4096 chips length. The remaining 1024 chips length is set as a transmission power off period during which no symbol is transmitted. Also, as similar to FIG. 5, the preamble part of the uplink PRACH transmits 16 symbol signatures (Si, i=0, . . . , 15) during the first 4096 chips length.

An Evolved Universal Mobil Telecommunication System (E-UMTS) will be described in more detail as follows.

FIG. 6 shows an exemplary structure of an Evolved Universal Mobile Telecommunications System (E-UMTS). The E-UMTS system is a system that has evolved from the UMTS system, and its standardization work is currently being performed by the 3GPP standards organization.

The E-UMTS network generally comprises at least one mobile terminal (i.e., user equipment: UE), base stations (i.e., Node Bs), a control plane server (CPS) that performs radio (wireless) control functions, a radio resource management (RRM) entity that performs radio resource management functions, a mobility management entity (MME) that performs mobility management functions for a mobile terminal, and an access gateway (AG) that is located at an end of the E-UMTS network and connects with one or more external networks. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

FIG. 7 shows an exemplary architecture of the radio interface protocol between the mobile terminal and the UTRAN (UMTS Terrestrial Radio Access Network). The radio interface protocol of FIG. 7 is horizontally comprised of a physical layer, a data link layer, and a network layer, and vertically comprised of a user plane for transmitting user data and a control plane for transferring control signaling. The radio interface protocol layer of FIG. 2 may be divided into L1 (Layer 1), L2 (Layer 2), and L3 (Layer 3) based upon the lower three layers of the Open System Interconnection (OSI) standards model that is known the field of communication systems.

Particular layers of the radio protocol control plane of FIG. 7 and of the radio protocol user plane of FIG. 8 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel, The RLC layer of Layer 2 supports the transmission of data with reliability. It should be noted that the RLC layer in FIG. 7 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a broadcast channel (BCH) used for transmitting system information, and a shared channel (SCH) used for transmitting user traffic or control messages. Also, as a downlink transport channel, there is a downlink Shared Control Channel (SCCH) that transmits necessary control information for the terminal to receive the downlink SCH. The downlink SCCH transmission includes information regarding a data variation, a data channel coding technique, and a data size where the data is transmitted to the downlink SCH.

As for channels used in uplink transmission for transmitting data from the mobile terminal to the network, there is a random access channel (RACH) used for transmitting an initial control message, and a shared channel (SCH) used for transmitting user traffic or control messages. Also, in an uplink transport channel, there is an uplink Shared Control Channel (SCCH) that transmits necessary control information for the terminal to receive the uplink SCH. The uplink SCCH transmission includes information regarding a data variation, a data channel coding technique, and a data size where the data is transmitted to the uplink SCH.

In the related art, when the mobile terminal moves from a source cell to a target cell, the mobile terminal uses a RACH to transmit a cell update message to the target cell. Namely, in order to transmit the cell update message, the terminal uses the RACH for an uplink time synchronization with the target cell and for an uplink resource allocation. However, due to a collision possibility of the RACH, the message transmission my be delayed, and a handover processing time is increased because of the possibility of RACH collision.

SUMMARY

The present invention has been developed in order to solve the above described problems of the related art. As a result, the present invention provides a method of transmitting and receiving control radio connection information that allows a faster and an efficient way of accessing a terminal to a target base station while performing a handover for the terminal to a cell of the target base station.

DESCRIPTION

One aspect of the present invention is the recognition by the present inventors regarding the problems and drawbacks of the related art described above and explained in more detail hereafter. Based upon such recognition, the features of the present invention have been developed.

In the related art, when the mobile terminal moves from a source cell to a target cell, the mobile terminal uses a RACH to transmit a cell update message to the target cell. However, because of a possibility for a RACH collision (i.e. the same signature is being selected from multiple terminals that use of the RACH), the processing time for the handover process may be delayed.

In contrast, the features of the present invention provide that the terminal receives necessary information from a source cell in advance (i.e., before the terminal transmits a RACH setup request to a network) in order to utilize the RACH in a later step. As a result, the terminal can connect with the target cell with minimal delays.

It should be noted that the features of the present invention may be related to issues regarding the long-term evolution (LTE) of the 3GPP standard. As such, the 3GPP standard and its related sections or portions thereof, as well as various developing enhancements thereof pertain to the present invention. For example, in present invention, a source enhanced Node B (eNB) may manage the source cell described above and a target enhanced Node B (eNB) may manage the target cell.

Figure 1:
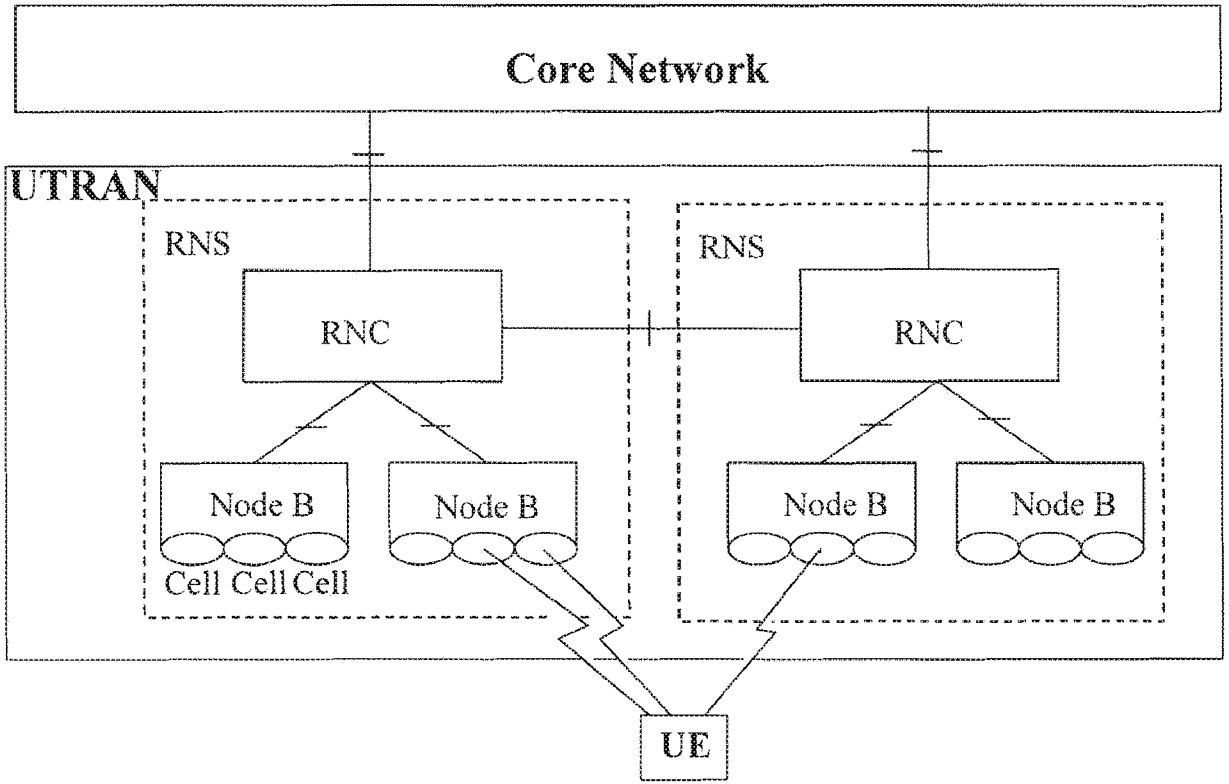
Fig 1 PRIOR ART
FIG. 1 shows an exemplary diagram illustrating an Universal Mobile Telecommunication System (UMTS) network of a conventional mobile communication system.
Figure 2:
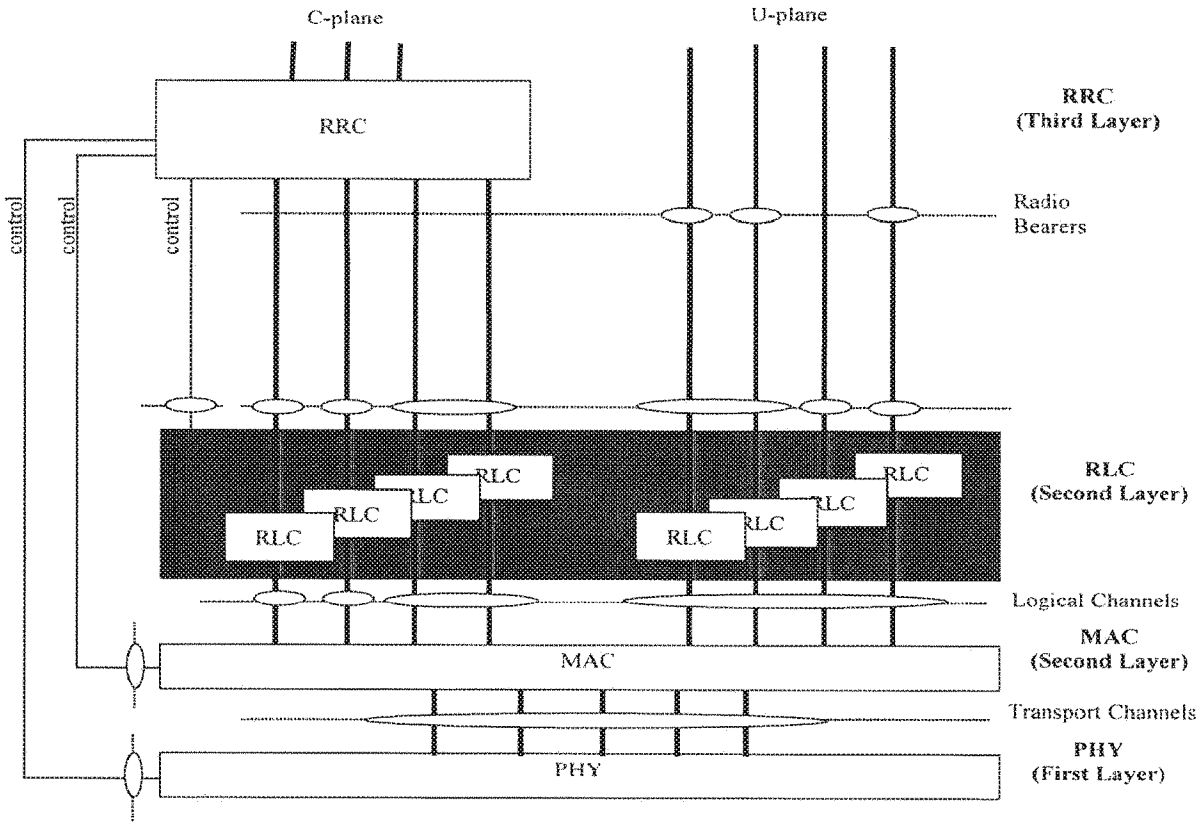
Fig 2 PRIOR ART
FIG. 2 shows an exemplary diagram illustrating a structure of a Radio Interface Protocol (RIP) between a UE and the UTRAN.
Figure 3:
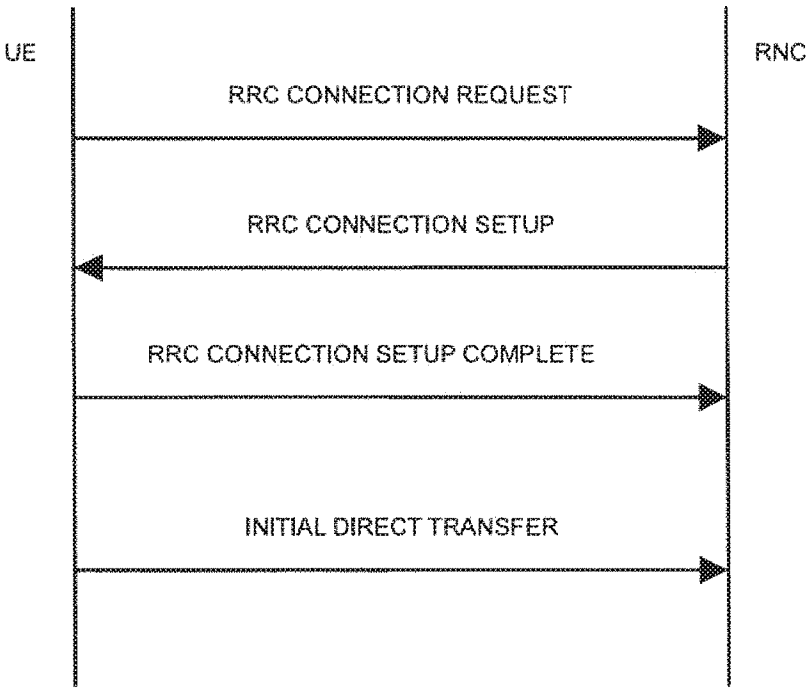
Fig 3 PRIOR ART
FIG. 3 shows an exemplary diagram for explaining how a RRC connection is established.
Figure 5:
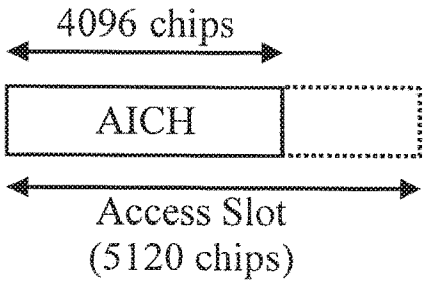
Fig 5 PRIOR ART
FIG. 5 illustrates an exemplary structure of an Acquisition Indicator Channel (AICH).
Figure 4:
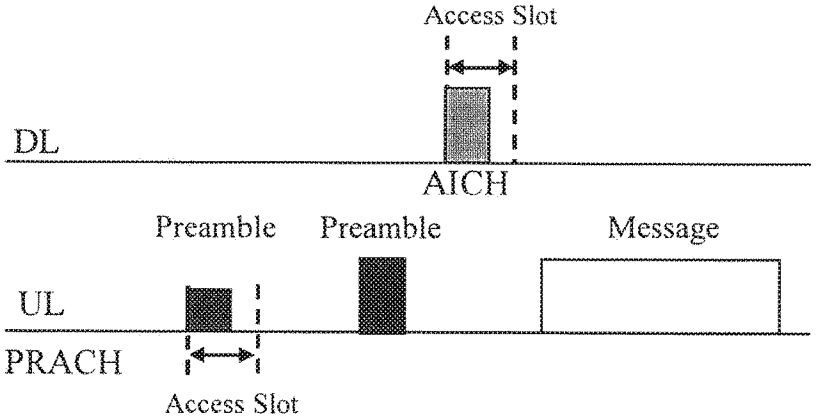
Fig 4 PRIOR ART
FIG. 4 shows how the physical random access channel (PRACH) power ramping and message transmission may be performed.
Figure 6:
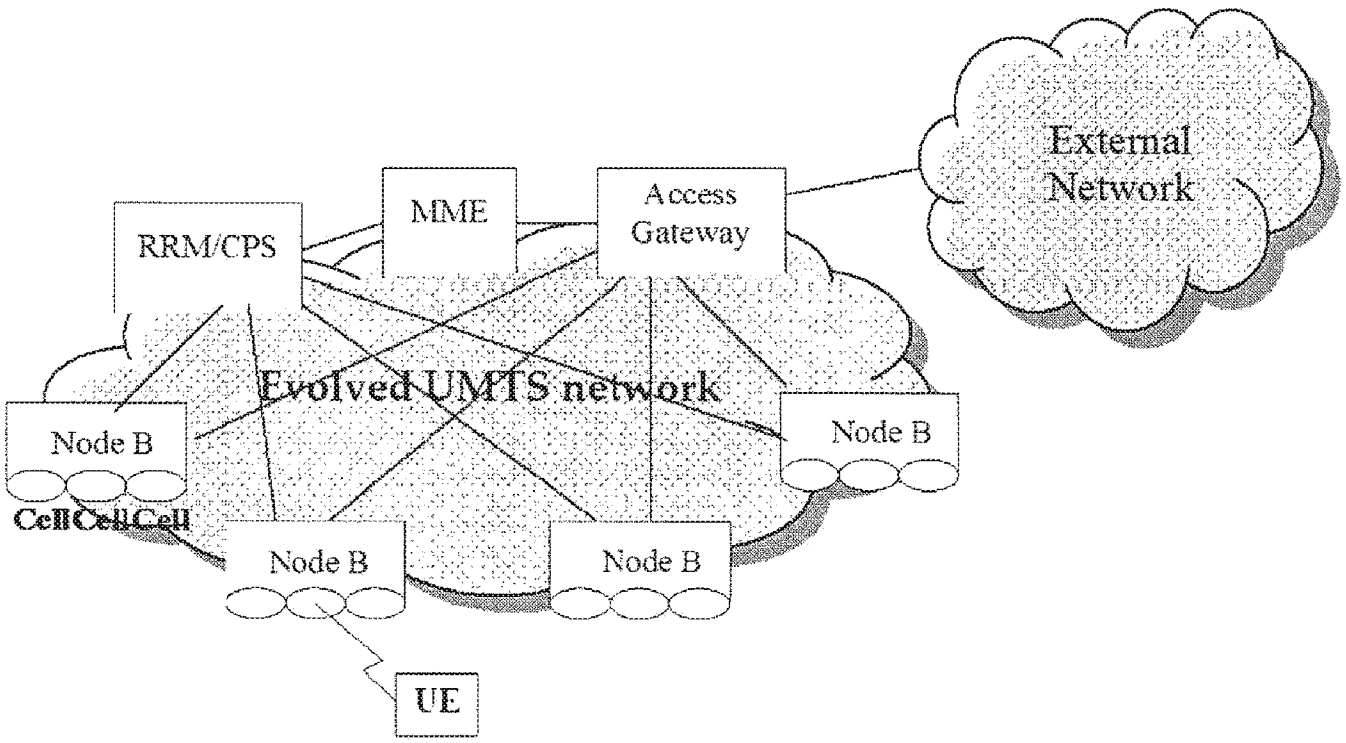
Fig 6 PRIOR ART
FIG. 6 shows an overview of an E-UMTS network architecture.
Figure 8:
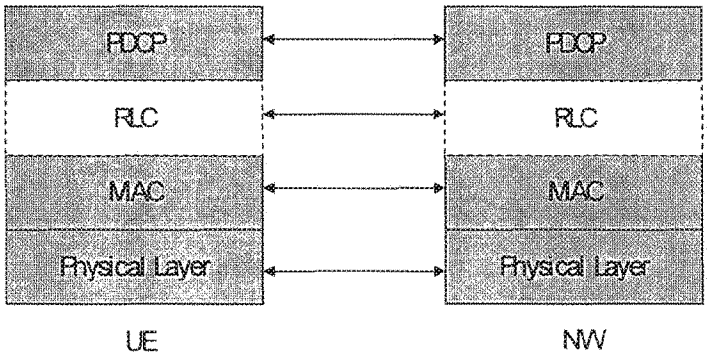
Fig 8 PRIOR ART
FIGS. 7 and 8 show an exemplary structure (architecture) of a radio interface protocol between a mobile terminal and a UTRAN according to the 3GPP radio access network standard.
Figure 7:
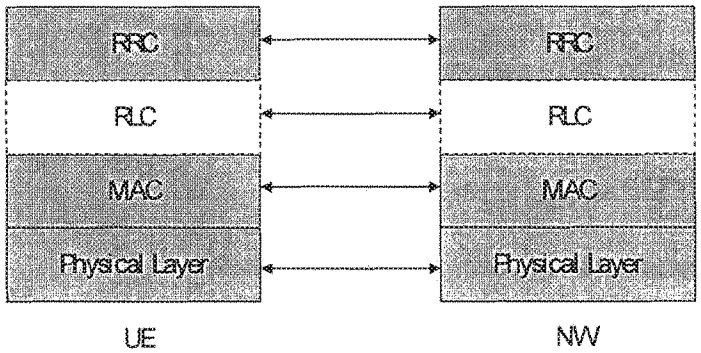
Fig 7 PRIOR ART
Figure 9:
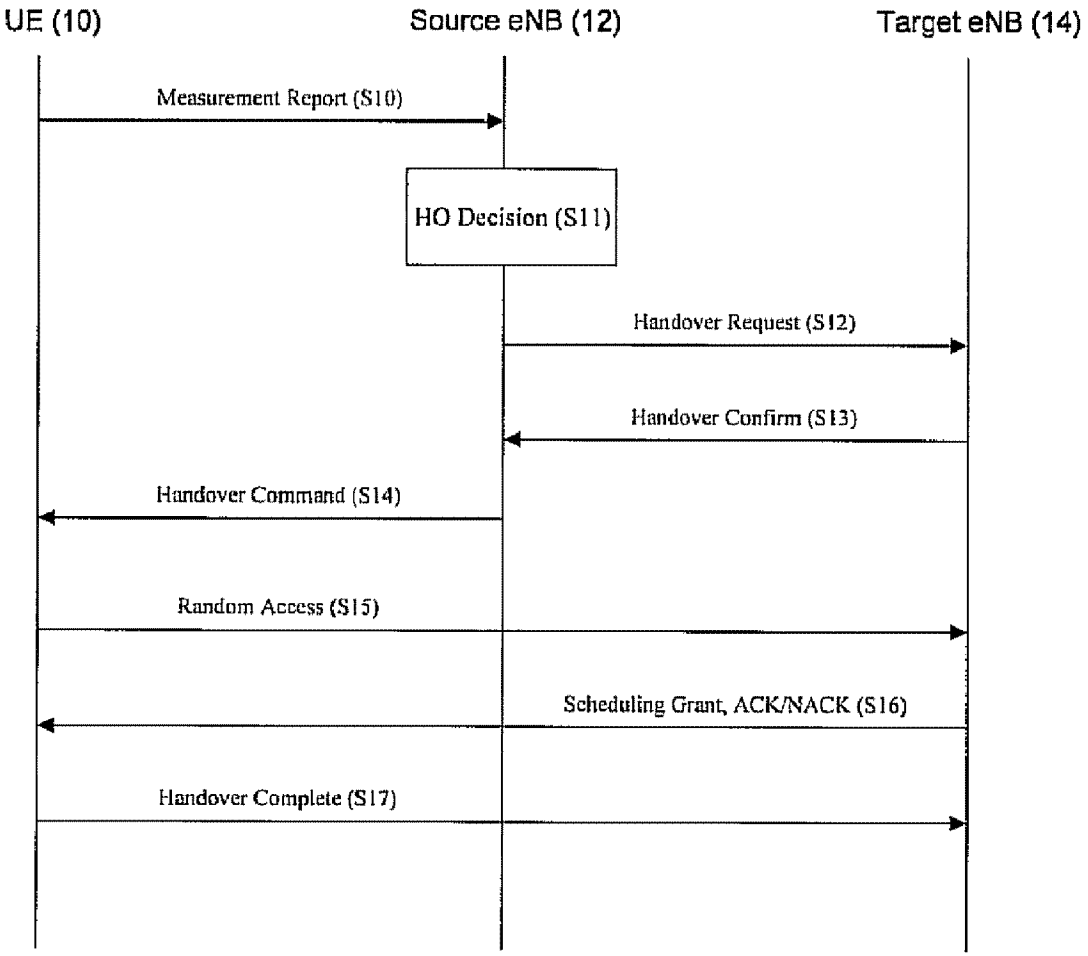
FIG. 9 shows an exemplary diagram for transmitting and receiving radio connection information according to an exemplary embodiment of the present invention.

FIG. 9 shows an exemplary diagram for transmitting and receiving radio connection information according to an exemplary embodiment of the present invention.

As illustrated in FIG. 9, the UE (or terminal) (10) may transmit a measurement report to the source eNB (12) by measuring a condition of a downlink physical channel for other cells periodically or upon the occurrence of event (i.e., user command, setting information, etc) (S10). As the measurement report is transmitted to the source eNB with a result for the measured condition of the downlink physical channel for other cells, the eNB may determine which cell, that the UE will be moved to, has a better channel condition compared to the current cell.

Using the measurement report which contains information about the condition of the downlink physical channel for other cells, the source eNB (12) may determine whether to perform a handover for the UE (10) from a current cell to the other cell, or whether to keep the UE in current cell (811).

If the UE (10) needs to perform handover from the source eNB to an other particular cell, the source eNB (12) may transmit a handover request message to the target eNB (14) in order to request a handover for the UE to the target eNB. (S12) Here, the handover request message may include a UE identification (ID) and/or a buffer state of the UE.

If the target eNB (14) allows the handover to be performed for the UE upon receiving the handover request from the source eNB (12), the target eNB (14) may transmit a handover confirm message to the source eNB (12) (S13). The handover confirm message may include information that may be necessary in the course of connecting the UE (10) to the target cell. Namely, the necessary information may include information used in the RACH which is used for performing a radio access procedure from the UE to the target eNB. For example, when the RACH is being used while the UE accesses to the target eNB, the UE may utilize a preamble which is selected from signatures contained in the UE. System information transmitted from the eNB may include signatures related information. So, the UE may transmit the preamble to the eNB after selecting one of the signatures. However, in some cases, one or more UEs could select a same signature because there are a limited number of signatures. Therefore, if two or more UEs transmit the preamble of the same signature to the eNB at the same time, the eNB can not possibly determine which UE transmitted such preamble. To avoid this from happening, the UE should not transmit a preamble that is selected from the signatures used in the RACH during the handover, but rather, the UE may transmit a preamble of a previously defined signature through the handover confirm message from the target eNB. Here, the target eNB may acknowledge the mapping relationship between an UE's ID and the signature, where the UE's ID is transmitted from the Handover Request Message. Therefore, when the UE transmits the preamble to the target eNB for establishing a radio connection to the target cell, the target eNB may determine an ID of the UE using the preamble. Also, the Handover Confirm message may include a transmission characteristic of the preamble that is transmitted from the UE (10) to the target eNB (14). The transmission characteristic may relate to frequency and time used in transmitting the preamble information.

If the source eNB (12) receives the Handover confirm message of the UE from the target eNB (14), the source eNB (12) may transmit a Handover Command message to the UE (10). (S14) The Handover Command message may include necessary information which comes from the target eNB, for establishing the radio connection to the target eNB. Also, the Handover Command message may include information of the signature and the preamble which is to be used in the access procedure to the target eNB.

The UE (10), which received the handover command message from the source eNB (12), may utilize the RACH for establishing the radio connection between the UE and the target eNB. (S15) Here, the preamble transmission of the UE is based upon information in the handover command message received from the source eNB (12). Also, if the information includes system information of the target eNB (14), the UE (10) may perform a radio accessing procedure without reading broadcast system information from the target eNB (14). For example, when the UE performs to establish the radio connection with a new cell, the UE usually reads system information of the corresponding eNB after time synchronization of the downlink. Since the system information includes information related to a radio access request message from the UE to an uplink, the radio accessing is performed after reading the system information. However, according to the present invention, the UE (10) may perform the radio access procedure without reading the system information in the target cell, as the system information of the target eNB is previously transmitted to the source eNB in advance and the system information was included in the handover command message.

The target eNB (14) may receive the preamble of the UE. Since the target eNB (14) already allocates a signature used in the preamble to the UE in the use of handover, the UE can be identified by the preamble. The target eNB (14) may allocate the uplink radio resource to the UE (10) for the UE to access the target eNB and to transmit the handover complete message to the target eNB. (S16) Also, the allocated radio resources information may be transmitted to the UE (10) via a downlink SCH. Alternatively, the allocated radio resources information may be transmitted via a downlink SCCH. Further, the allocated radio resources may be transmitted within an ACK/NACK signaling.

The UE (10) may transmit the handover complete message to the target eNB (14) based on a scheduling grant of the target eNB. (S17) If the scheduling grant includes information of allocated radio resources upon an allocation request of the uplink radio resources of the UE, the scheduling grant may be transmitted with the ACK/NACK signaling of the preamble transmitted from the UE (10). In this case, the Handover complete message from the UE may include a buffer state of the UE or its related information. If the allocated uplink radio resources, which is transmitted from the target eNB (14) to the UE (10), is sufficient, the handover complete message may be transmitted with additional traffic data when there is additional uplink traffic data.

It can be said that the present invention provides a method of transmitting access information in a mobile communications system, the method comprising: deciding to perform a handover for a terminal to a cell of a target base station; transmitting, to the target base station, a handover request for performing a handover from a source base station to the target base station; receiving access information from the target base station that received the handover request, wherein the access information is then transmitted to the terminal to access the target base station; receiving a measurement report from the terminal; determining whether to perform a handover based upon the received measurement report; and transmitting a handover command that contains the access information to the terminal upon receiving the response by the source base station, wherein the measurement report includes a downlink physical channel condition for multiple cells including the cell of the target base station, the handover request includes at least one of terminal identification (ID) information and/or buffer state information of the terminal, the access information is random access information, the access information is for a random access channel (RACH), the access information includes at least one of signature information and/or preamble information, the signature information is determined by the target base station based upon terminal identification information, the preamble information includes frequency information and time information, and the handover command includes access information which contains at least one of signature information and/or preamble information to allow the terminal to access the target base station.

Also, the present invention may provide a method of transmitting access information in a mobile communications system, the method comprising: receiving, from a source base station, a handover request for performing a handover from the source base station to a target base station; transmitting access information to the source base station upon receiving the handover request, wherein the access information is used to allow a terminal to access the target base station; allocating a radio resource for an uplink and transmitting radio resource allocation information to the terminal; receiving, from the terminal, preamble information of the terminal; and receiving a handover complete message from the terminal, wherein the radio resource allocation information is transmitted to the terminal through at least one of a downlink shared channel (SCH) and a downlink shared control channel (SCCH), an ACK/NACK signal includes the allocated resource information, the preamble information is used to identify the terminal, the handover complete message includes at least one of buffer state information of the terminal and uplink traffic data, and the handover complete message includes uplink traffic data if the radio resource allocation for the uplink is sufficient to transmit the uplink traffic data.

It can be said that the present invention provides a method of receiving access information in mobile communications system, the method comprising: receiving access information from a source base station after a handover is accepted by a target base station; performing a random access procedure with the target base station using the received access information; transmitting a measurement report to the source base station by measuring a condition of a downlink physical channel for other cells, the measuring performed periodically or upon an occurrence of an event; transmitting the preamble information to the target base station for performing a radio access procedure with the target cell; receiving, from a network, radio resource information through a downlink shared channel (SCCH); receiving, from a network, radio resource information within an ACK/NACK signaling; and transmitting a handover complete message to the target base station, wherein the measurement report is used to determine whether to perform a handover from a current cell to an other cell, the access information is random access information for a random access channel (RACH) which includes preamble information within signature information, the access information includes a transmission characteristic of the preamble information, the transmission characteristic relates to frequency and time used in transmitting the preamble information, the access information includes system information transmitted from the target base station, and the handover complete message includes at least one of buffer state information of the terminal and uplink traffic data.

The present invention also may provide a mobile terminal for establishing a radio connection to a target base station in a mobile communications system, the mobile terminal comprising: a radio protocol adapted to receive access information from a source base station after a handover is accepted by the target base station and to perform a random access procedure with the target base station using the received access information, wherein the source base station is a source enhanced Node B (source eNB) and the target base station is a target enhanced Node B (target eNB) respectively in an Evolved Universal Mobile Telecommunication System (E-UMTS).

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CDROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

[1. A method of transmitting uplink data in a wireless communication system, the method comprising:

receiving in a terminal from a network, preamble information generated by the network, wherein the preamble information is received via dedicated signaling in downlink, wherein the received preamble information is either a dedicated preamble or an index of the dedicated preamble, and wherein the preamble information is used for performing a random access channel (RACH) procedure, and wherein the dedicated preamble is used for a specific terminal;

transmitting from the terminal to the network, the dedicated preamble on a random access channel (RACH) in uplink; uplink receiving in the terminal, a random access response in response to the transmitted dedicated preamble, wherein the random access response includes at least one of time information for a handover operation, an uplink grant for the handover operation, time information for a downlink data arrival, or a random access preamble identifier; and transmitting the uplink data to the network using the uplink grant included in the random access response.]

[2. The method of claim 1, wherein the preamble information is a non-contention random access preamble assigned to the specific terminal by the network.]

[3. The method of claim 1, wherein the preamble information is signaled via a handover command generated by a target base station.]

[4. The method of claim 1, wherein the preamble information is signaled via a physical downlink control channel (PDCCH).]

[5. The method of claim 1, wherein the random access response is received on a downlink shared channel (DL-SCH).]

[6. A mobile terminal for transmitting uplink data in a wireless communication system, the mobile terminal comprising:

a transceiver configured to transmit or receive the uplink data;

a memory configured to store the uplink data transmitted or received via the transceiver or from an external source; and a processor cooperating with the transceiver and the memory, the processor configured to:

receive, from a network, preamble information generated by the network, wherein the preamble information is received via dedicated signaling in downlink, wherein the preamble information is used for performing a random access channel (RACH) procedure, wherein the received preamble information is either a dedicated preamble or an index of the dedicated preamble, and wherein the dedicated preamble is used for a specific terminal;

transmit, to the network, the dedicated preamble on a random access channel (RACH) in uplink;

receive a random access response in response to the transmitted dedicated preamble, wherein the random access response includes at least one of time information for a handover operation, an uplink grant for the handover operation, time information for a downlink data arrival, or a random access preamble identifier; and transmit the uplink data to the network using the uplink grant included in the random access response.]

[7. The mobile terminal of claim 6, wherein the preamble information is a non-contention random access preamble assigned to the specific terminal by the network.]

[8. The mobile terminal of claim 6, wherein the preamble information is signaled via a handover command generated by a target base station.]

[9. The mobile terminal of claim 6, wherein the preamble information is signaled via a physical downlink control channel (PDCCH).]

[10. The mobile terminal of claim 6, wherein the random access response is received on a downlink shared channel (DL-SCH).]

*11. A method comprising:*

*receiving, by a terminal and after a source base station has determined that a handover should occur to a target base station, synchronization information generated by a transmitter in the source base station in a network, wherein the synchronization information is received via control signaling in a downlink transmission, wherein the synchronization information is used to synchronize the terminal to the network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal; and*

*transmitting, by the terminal, and in response to the handover command message, a synchronization signal associated with the synchronization information on a synchronization channel in an uplink transmission, wherein the terminal connects with the target base station during the random access procedure using the preamble information identified by the target base station; and*

*transmitting, by the terminal, a handover complete message to the target base station.*

*12. The method of claim 11, wherein a synchronization response is received by the terminal in response to the transmission of the synchronization signal from the terminal.*

*13. The method of claim 12, where the synchronization response is received on a downlink shared channel.*

*14. The method of claim 12, wherein the synchronization response includes at least one of time information for uplink data arrival, information on the synchronization signal for the terminal, information for a handover operation and an uplink grant for the handover operation.*

*15. The method of claim 14, wherein uplink data is transmitted to the network using the uplink grant.*

*16. The method of claim 11, wherein the synchronization information is information for a non-contention synchronization signal assigned to a specific terminal by the network.*

*17. The method of claim 11, wherein the synchronization information is signaled via the handover command message generated by the source base station.*

*18. The method of claim 17, wherein the handover command message is generated once a threshold measurement is received by the base station.*

*19. The method of claim 18, wherein the handover command message is generated once a threshold measurement is received by a measurement report and wherein the measurement report contains signal strength measurements of at least one of a plurality of surrounding base stations.*

*20. The method of claim 11, wherein the synchronization information is signaled via a downlink control channel.*

*21. A method comprising:*

*transmitting, by a transmitter in a base station to a terminal, and after a source base station has determined that a handover should occur to a target base station, synchronization information generated by the transmitter in the source base station in a network, wherein the synchronization information is transmitted via control signaling in a downlink transmission to the terminal, wherein the synchronization information is used to synchronize the terminal to the network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal, the synchronization information further usable by the terminal, in response to the handover command message, to transmit a synchronization signal associated with the synchronization information on a synchronization channel in an uplink transmission, wherein the terminal can connect with the target base station during the random access procedure using the preamble information identified by the target base station.*

*22. The method of claim 21, wherein uplink data is transmitted to the network using an uplink grant.*

*23. The method of claim 22, wherein the synchronization information is signaled via the handover command message generated by the base station.*

*24. The method of claim 23, wherein the handover command message is generated once a threshold measurement is received by the base station.*

*25. The method of claim 24, wherein the handover command message is generated once a threshold measurement is received by a measurement report and wherein the measurement report contains signal strength measurements of at least one of a plurality of surrounding base stations.*

*26. A first terminal configured to transmit uplink data to and receive downlink data from a target base station in a network having a plurality of terminals including the first terminal and a source base station, comprising:*

*a memory;*

*a processor;*

*a receiver and the processor in the first terminal that receive, after the source base station has determined that a handover should occur to the target base station, synchronization information generated by a transmitter in the source base station in a network, wherein the*

*synchronization information is received via control signaling in a downlink transmission, wherein the synchronization information is used to synchronize the first terminal to the network, and wherein the synchronization information is a handover command message from the source base station, wherein the handover command message includes access information, and the access information includes preamble information as identified by the target base station for use by the first terminal during a random access procedure with the target base station, wherein the preamble information is a dedicated preamble used only for a specific terminal; and*

*a transmitter and the processor in the first terminal that transmit, in response to the handover command message, a synchronization signal associated with the synchronization information on a synchronization channel in an uplink transmission, wherein the first terminal connects with the target base station during the random access procedure using the preamble information identified by the target base station; and*

*the transmitter and the processor in the first terminal further transmitting a handover complete message to the target base station.*

*27. The first terminal of claim 26, wherein a synchronization response is received in the first terminal in response to the transmission of the synchronization signal from the first terminal.*

*28. The first terminal of claim 26, wherein the synchronization response includes*

*at least one of time information for an uplink data arrival, information on the synchronization signal for the first terminal, information for a handover operation, and an uplink grant for a handover operation.*

*29. The first terminal of claim 28, wherein uplink data is transmitted to the network using the uplink grant.*

*30. The first terminal of claim 26, wherein the synchronization information is information for a non-contention synchronization signal assigned to the specific terminal by the network.*

*31. The first terminal of claim 26, wherein the synchronization information is signaled via the handover command message generated by the target base station.*

*32. A source base station, comprising:*

*a memory;*

*a processor;*

*a transceiver, the transceiver configure to:*

*transmit downlink data and receive uplink data;*

*the processor and memory in the source base station configured to:*

*receive the uplink data;*

*generate, after the source base station has determined that a handover should occur to a target base station, synchronization information, wherein the synchronization information is transmitted via control signaling in a downlink transmission to a terminal, wherein the synchronization information is used to synchronize the terminal to a network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal.*

*33. The base station of claim 32, wherein the uplink data is transmitted to the network using an uplink grant.*

*34. The base station of claim 32, wherein the synchronization information is information for a non-contention synchronization signal assigned to the specific terminal by the network.*

*35. The base station of claim 32, wherein the synchronization information is signaled via the handover command message generated by the target base station.*

*36. The base station of claim 32, wherein the handover command message is generated once a threshold measurement is received by a measurement report and wherein the measurement report contains signal strength measurements of at least one of a plurality of surrounding base stations.*

*37. The base station of claim 32, wherein the synchronization information is signaled via a downlink control channel.*

*38. A non-transitory computer readable medium having instructions thereon that when executed instructions that when executed by at least one processor of a terminal perform a method comprising:*

*receiving, by the terminal and after a source base station has determined that a handover should occur to a target base station, synchronization information generated by a transmitter in the source base station in a network, wherein the synchronization information is received via control signaling in a downlink transmission, wherein the synchronization information is used to synchronize the terminal to the network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal; and*

*transmitting, by the terminal, and in response to the handover command message, a synchronization signal associated with the synchronization information on a synchronization channel in an uplink transmission, wherein the terminal connects with the target base station during the random access procedure using the preamble information identified by the target base station; and*

*transmitting, by the terminal, a handover complete message to the target base station.*

*39. A non-transitory computer readable medium having instructions thereon that when executed by at least one processor of a base station perform a method comprising:*

*transmitting downlink data and receive uplink data; and*

*generating, after a source base station has determined that a handover should occur to a target base station, synchronization information, wherein the synchronization information is transmitted via control signaling in a downlink transmission to a terminal, wherein the synchronization information is used to synchronize the terminal to a network, and wherein the synchronization information is a handover command message from the source base station, wherein the handover command message includes access information, and the access information includes preamble information as identified by a target base station for use by the terminal during a random access procedure with the target base station, wherein the preamble information is a dedicated preamble used only for a specific terminal.*

*40. A system comprising:*

*means for receiving, by a terminal and after a source base station has determined that a handover should occur to a target base station, synchronization information generated by a transmitter in the source base station in a network, wherein the synchronization information is received via control signaling in a downlink transmission, wherein the synchronization information is used to synchronize the terminal to the network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal; and*

*means for transmitting, by the terminal and in response to the handover command message, a synchronization signal associated with the synchronization information on a synchronization channel in an uplink transmission, wherein the terminal connects with the target base station during the random access procedure using the preamble information identified by the target base station; and*

*means for transmitting, by the terminal, a handover complete message to the target base station.*

*41. A system comprising:*

*means for transmitting downlink data and receive uplink data;*

*means for generating, after a source base station has determined that a handover should occur to a target base station, synchronization information, wherein the synchronization information is transmitted via control signaling in a downlink transmission to a terminal, wherein the synchronization information is used to synchronize the terminal to a network, and wherein the synchronization information is a handover command message from the source base station, wherein the handover command message includes access information, and the access information includes preamble information as identified by the target base station for use by the terminal during a random access procedure with the target base station, wherein the preamble information is a dedicated preamble used only for a specific terminal.*

* * * * *